US012566941B2

(12) United States Patent　　　　(10) Patent No.:　US 12,566,941 B2
Aladahalli et al.　　　　　　　　　　(45) Date of Patent:　　Mar. 3, 2026

(54) EXTENSION OF EXISTING NEURAL NETWORKS WITHOUT AFFECTING EXISTING OUTPUTS

(71) Applicant: GE Precision Healthcare LLC, Milwaukee, WI (US)

(72) Inventors: Chandan Aladahalli, Bengaluru (IN); Vikram Melapudi, Bangalore (IN); Krishna Seetharam Shriram, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 1062 days.

(21) Appl. No.: 17/212,022

(22) Filed: Mar. 25, 2021

(65) Prior Publication Data

US 2022/0309315 A1　　Sep. 29, 2022

(51) Int. Cl.
*G06N 3/04* (2023.01)
*G06N 3/084* (2023.01)

(52) U.S. Cl.
CPC .............. *G06N 3/04* (2013.01); *G06N 3/084* (2013.01)

(58) Field of Classification Search
CPC ................................. G06N 3/04; G06N 3/084
See application file for complete search history.

(56) References Cited

U.S. PATENT DOCUMENTS

| | | | |
|---|---|---|---|
| 2020/0104706 A1* | 4/2020 | Sandler ................... | G06N 3/045 |
| 2021/0209513 A1* | 7/2021 | Torres ..................... | G06N 20/00 |
| 2022/0270240 A1* | 8/2022 | Jin .......................... | G16H 50/20 |

FOREIGN PATENT DOCUMENTS

WO　　　2020142077 A1　　7/2020

OTHER PUBLICATIONS

Liu, F., Jang, H., Kijowski, R., Zhao, G., Bradshaw, T., & McMillan, A. B. (Nov. 2018). A deep learning approach for 18 F-FDG PET attenuation correction. EJNMMI physics, 5, 1-15. (Year: 2018).*
Zhang, Z., Wu, C., Coleman, S., & Kerr, D. (Feb. 2020). DENSE-INception U-net for medical image segmentation. Computer methods and programs in biomedicine, 192, 105395. (Year: 2020).*
Tang, R., Zhang, Z., Chen, X., Waller, L., Zhang, A. C., Chen, J., . . . & Lo, Y. H. (Dec. 2020). 3D side-scattering imaging flow cytometer and convolutional neural network for label-free cell analysis. APL Photonics, 5(12). (Year: 2020).*

(Continued)

*Primary Examiner* — Michael J Huntley
*Assistant Examiner* — Maggie Thanh Maido
(74) *Attorney, Agent, or Firm* — Amin, Turocy & Watson, LLP

(57) ABSTRACT

Systems and techniques that facilitate extension of existing neural networks without affecting existing outputs are provided. In various embodiments, a receiver component can access a neural network, wherein the neural network includes a first set of layers trained to perform a first computing task. In various instances, an extension component can insert a second set of layers into the neural network, wherein the second set of layers receive as input latent activations from the first set of layers. In various aspects, a training component can train, without changing the first set of layers, the second set of layers to perform a second computing task that is different from the first computing task.

20 Claims, 10 Drawing Sheets

(56) References Cited

OTHER PUBLICATIONS

Fang, Y., Ma, Z., Zhang, Z., Zhang, X. Y., & Bai, X. (Aug. 2017). Dynamic Multi-Task Learning with Convolutional Neural Network. In IJCAI (pp. 1668-1674). (Year: 2017).*

Zhuang, N., Yan, Y., Chen, S., & Wang, H. (Aug. 2018). Multi-task learning of cascaded cnn for facial attribute classification. In 2018 24th International Conference on Pattern Recognition (ICPR) (pp. 2069-2074). IEEE. (Year: 2018).*

Standley, T., Zamir, A., Chen, D., Guibas, L., Malik, J., & Savarese, S. (Sep. 2020). Which tasks should be learned together in multi-task learning ?. In International conference on machine learning (pp. 9120-9132). PMLR. (Year: 2020).*

Vandenhende, S., Georgoulis, S., Van Gansbeke, W., Proesmans, M., Dai, D., & Van Gool, L. (Sep. 2020). Multi-Task Learning for Dense Prediction Tasks: A Survey. arXiv preprint arXiv:2004.13379. (Year: 2020).*

Ruder, S. | An Overview of Multi-Task Learning in Deep Neural Networks. arXiv preprint arXiv:1706.05098 (2017), 32 pages.

Mullapudi, R. T. et al. | HydraNets: Specialized Dynamic Architectures for Efficient Inference. Proceedings of the IEEE Conference on Computer Vision and Pattern Recognition (CVPR), 2018, pp. 8080-8089.

Mehta, S. et al. | Y-Net: Joint Segmentation and Classification for Diagnosis of Breast Biopsy Images. https://homes.cs.washington.edu/~shapiro/sachin-miccai18.pdf, 8 pages, last accessed on Mar. 14, 2021.

CN application 202210246109.8 filed Mar. 14, 2022—Office Action issued Oct. 12, 2024; 7 pages; no translation available.

* cited by examiner

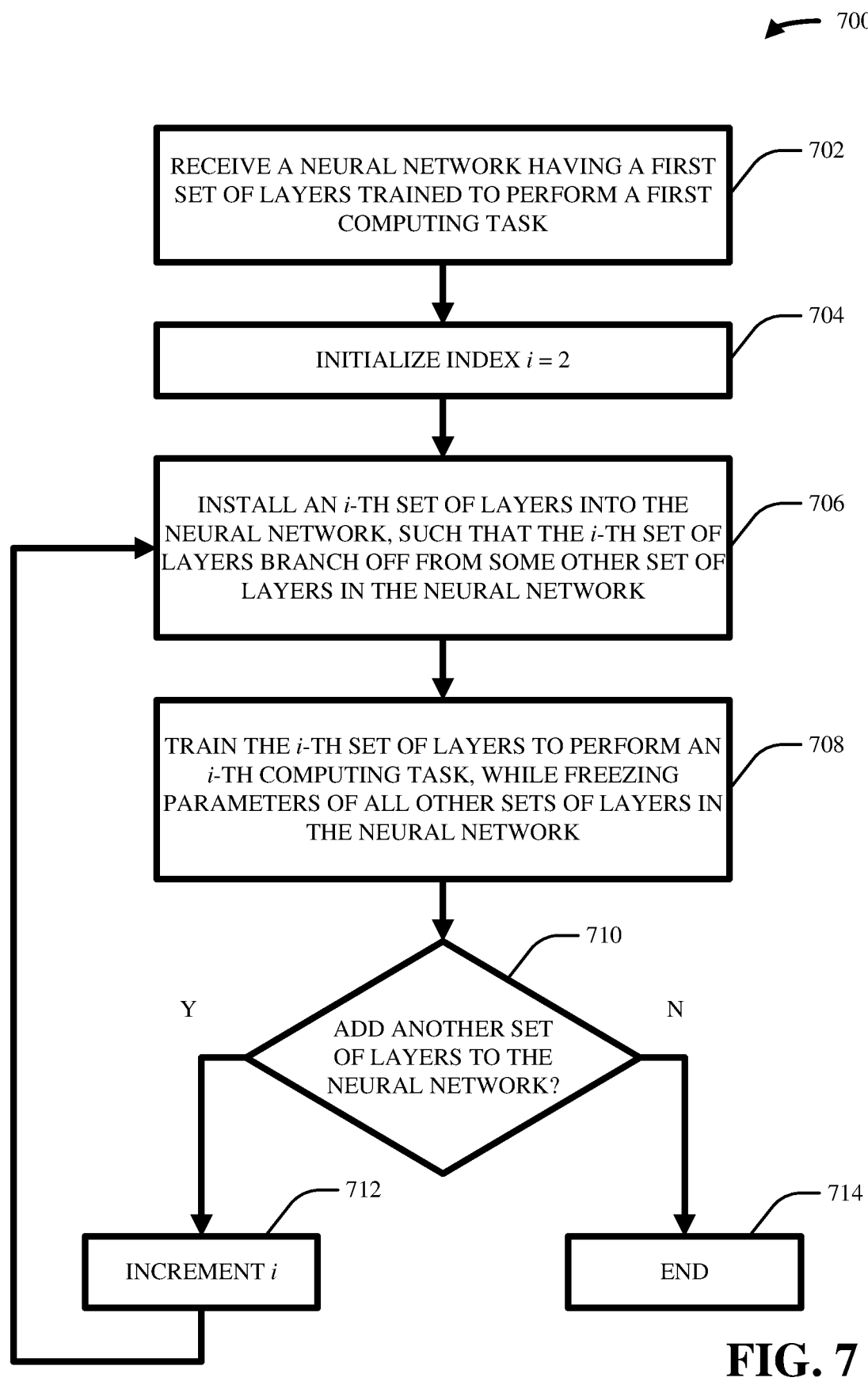

— 700

RECEIVE A NEURAL NETWORK HAVING A FIRST SET OF LAYERS TRAINED TO PERFORM A FIRST COMPUTING TASK — 702

INITIALIZE INDEX $i = 2$ — 704

INSTALL AN $i$-TH SET OF LAYERS INTO THE NEURAL NETWORK, SUCH THAT THE $i$-TH SET OF LAYERS BRANCH OFF FROM SOME OTHER SET OF LAYERS IN THE NEURAL NETWORK — 706

TRAIN THE $i$-TH SET OF LAYERS TO PERFORM AN $i$-TH COMPUTING TASK, WHILE FREEZING PARAMETERS OF ALL OTHER SETS OF LAYERS IN THE NEURAL NETWORK — 708

— 710

ADD ANOTHER SET OF LAYERS TO THE NEURAL NETWORK?

Y     N

INCREMENT $i$ — 712

END — 714

FIG. 7

800

ACCESSING, BY A DEVICE OPERATIVELY COUPLED TO A PROCESSOR, A NEURAL NETWORK, WHEREIN THE NEURAL NETWORK INCLUDES A FIRST SET OF LAYERS TRAINED TO PERFORM A FIRST COMPUTING TASK — 802

INSERTING, BY THE DEVICE, A SECOND SET OF LAYERS INTO THE NEURAL NETWORK, WHEREIN THE SECOND SET OF LAYERS RECEIVE AS INPUT LATENT ACTIVATIONS FROM THE FIRST SET OF LAYERS — 804

TRAINING, BY THE DEVICE AND WITHOUT CHANGING THE FIRST SET OF LAYERS, THE SECOND SET OF LAYERS TO PERFORM A SECOND COMPUTING TASK THAT IS DIFFERENT FROM THE FIRST COMPUTING TASK — 806

EXECUTING, BY THE DEVICE, THE NEURAL NETWORK ON AN INPUTTED DATA CANDIDATE, WHEREIN THE FIRST SET OF LAYERS GENERATE A FIRST OUTPUT CORRESPONDING TO THE FIRST COMPUTING TASK, AND WHEREIN THE SECOND SET OF LAYERS GENERATE A SECOND OUTPUT CORRESPONDING TO THE SECOND COMPUTING TASK — 808

FIG. 8

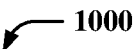
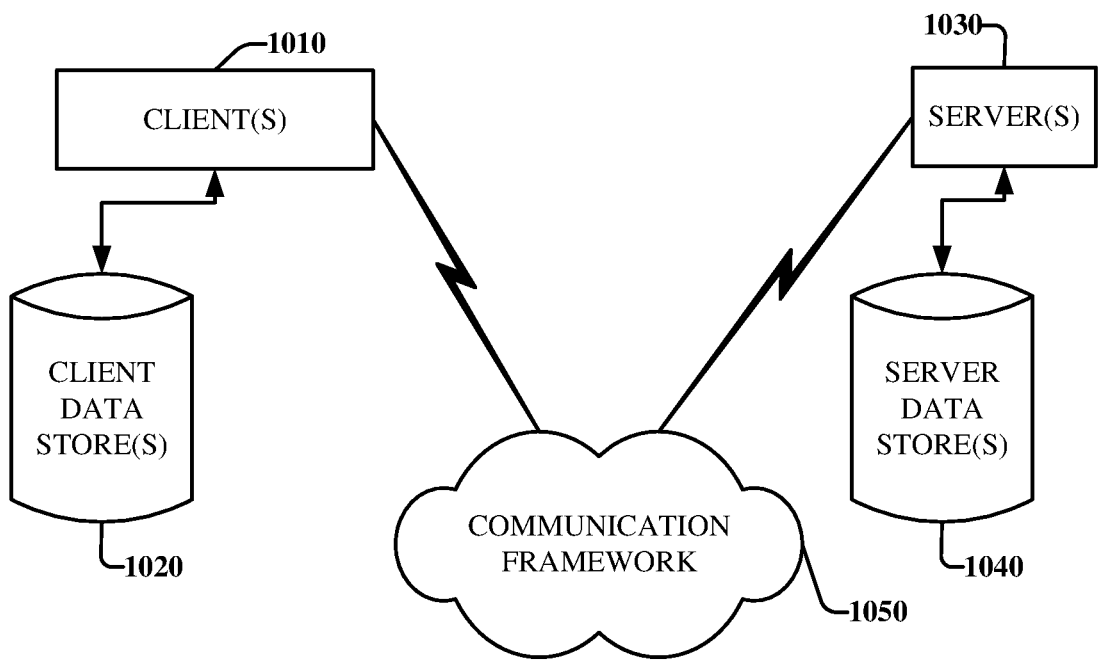
FIG. 10

EXTENSION OF EXISTING NEURAL NETWORKS WITHOUT AFFECTING EXISTING OUTPUTS

TECHNICAL FIELD

The subject disclosure relates generally to neural networks, and more specifically to techniques for extending existing neural networks without affecting existing outputs.

BACKGROUND

Neural networks enable the automation of various computing tasks. Accordingly, a given neural network can be trained to perform a given computing task. It can sometimes be desired to automate the performance of another computing task that is different from but related to the given computing task. There are two conventional options for accomplishing this. In the first conventional option, a completely separate neural network can be created from scratch and trained to perform the another computing task. In the second conventional option, the existing neural network can be completely retrained to perform both the given computing task and the another computing task. In either case, substantial expenditure of resources (e.g., computing time, processing power, computing memory, training data, regulatory compliance filings) can be required.

Accordingly, systems and/or techniques that can address this technical problem can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate extension of existing neural networks without affecting existing outputs are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various cases, the receiver component can access a neural network, wherein the neural network can include a first set of layers trained to perform a first computing task. In various aspects, the computer-executable components can further comprise an extension component. In various cases, the extension component can insert a second set of layers into the neural network, wherein the second set of layers receive as input latent activations from the first set of layers. In various instances, the computer-executable components can further comprise a training component. In various cases, the training component can train, without changing the first set of layers, the second set of layers to perform a second computing task that is different from the first computing task. In various embodiments, the computer-executable components can further comprise an execution component. In various cases, the execution component can execute the neural network on an inputted data candidate, wherein the first set of layers can generate a first output corresponding to the first computing task, and wherein the second set of layers can generate a second output corresponding to the second computing task.

According to one or more embodiments, the above-described system can be implemented as a computer-implemented method and/or a computer program product.

DESCRIPTION OF THE DRAWINGS

FIG. 7 illustrates a flow diagram of an example, non-limiting computer-implemented method that facilitates extension of existing neural networks without affecting existing outputs in accordance with one or more embodiments described herein.

FIG. 8 illustrates a flow diagram of an example, non-limiting computer-implemented method that facilitates extension of existing neural networks without affecting existing outputs in accordance with one or more embodiments described herein.

FIG. 10 illustrates an example networking environment operable to execute various implementations described herein.

DETAILED DESCRIPTION

Figure 1:
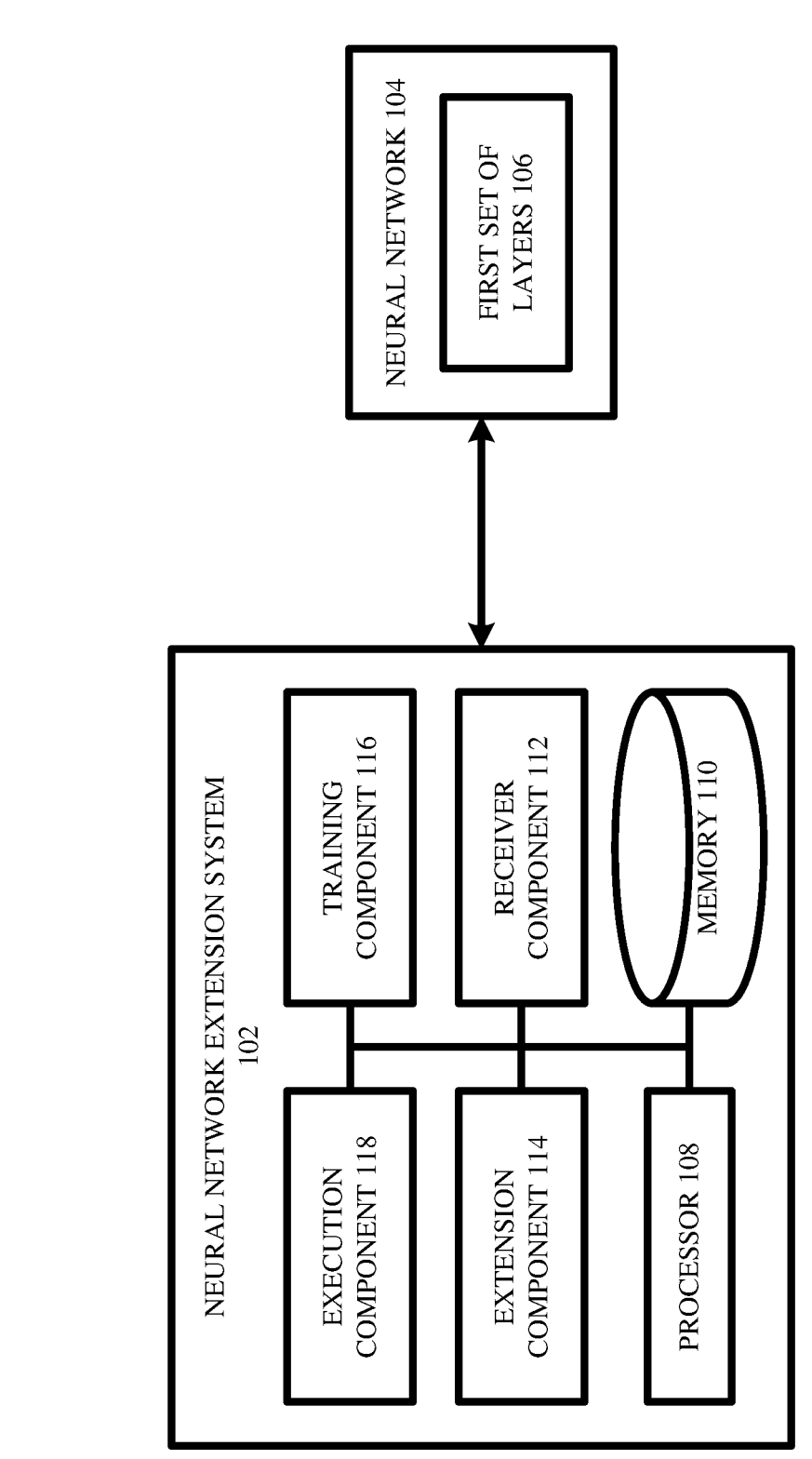
FIG. 1 illustrates a block diagram of an example, non-limiting system that facilitates extension of existing neural networks without affecting existing outputs in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, neural networks (and/or any other suitable machine learning models) can enable the automation of various computing tasks. Non-limiting examples of such computing tasks can include image/video classification, image/video segmentation, audio classification, audio segmentation, and/or any other suitable type of data classification, segmentation, and/or forecasting.

In various instances, an existing neural network can be trained (e.g., via supervised training, unsupervised training, reinforcement learning) to perform a first computing task. It can sometimes be desired to automate the performance of a second computing task that is different from but related to the first computing task. As those having ordinary skill in the art will appreciate, two computing tasks can be different but nevertheless related to each other if they can each be performed on the same input data. For example, image classification and image segmentation are different computing tasks (e.g., the former outputs a label that classifies and/or characterizes an input image, while the latter outputs a pixel-wise mask that partitions an input image into different image portions), but they can each be performed on a given input image. Accordingly, image classification and image segmentation can be considered as different but related computing tasks. Similarly, audio classification and audio segmentation are different computing tasks (e.g., the former outputs a label that classifies and/or characterizes an input audio time-series, while the latter outputs a mask that partitions an input audio time-series into different time segments), but they can each be performed on a given input audio time-series. Accordingly, audio classification and audio segmentation can be considered as different but related computing tasks. In contrast, image classification and audio classification cannot each be performed on the same input data (e.g., the former can be executed on an input image while the latter cannot be executed on an input image; the latter can be executed on an input audio time-series while the former cannot be executed on an input audio time-series). Accordingly, image classification and audio classification can be considered as unrelated computing tasks (notwithstanding that they can both be considered to be within the umbrella field of data classification). Likewise, image segmentation and audio segmentation cannot each be performed on the same input data (e.g., the former can be executed on an input image while the latter cannot be executed on an input image; the latter can be executed on an input audio time-series while the former cannot be executed on an input audio time-series). Accordingly, image segmentation and audio segmentation can be considered as unrelated computing tasks (notwithstanding that they can both be considered to be within the umbrella field of data segmentation).

When given an existing neural network that is trained to perform a first computing task, there are two conventional techniques for automating a second computing task that is different from but related to the first computing task. On the one hand, a second neural network can be trained from scratch to perform the second computing task. For example, if the first computing task is image segmentation and the second computing task is image classification, then the existing neural network can be trained to perform image segmentation, and a second neural network can be separately trained to perform image classification. Thus, when given an input image, that input image can be fed to the existing neural network which can yield image segmentation results, and that input image can also be fed to the second neural network which can yield image classification results. Unfortunately, when this approach is implemented, there are two independent neural networks to be stored, maintained, deployed, and/or monitored, which can require voluminous additional training data and/or which can consume excessive amounts of computing time, computing memory, and/or computing resources.

On the other hand, the existing neural network can be retrained to perform both the first computing task and the second computing task. To continue the above example, if the first computing task is image segmentation and the second computing task is image classification, then the existing neural network can be retrained to perform both image segmentation and image classification. Thus, when given an input image, that input image can be fed to the newly-retrained existing neural network which can yield both image segmentation results and image classification results. Unfortunately, when this approach is implemented, the performance of the existing neural network with respect to the first computing task can be impacted, which can result in the consumption of excessive amounts of time and/or resources. Specifically, to continue the above example, the existing neural network can have been previously trained to perform image segmentation, meaning that the existing neural network can have undergone extensive image segmentation validation to ensure regulatory compliance. When the existing neural network is conventionally retrained to perform both image segmentation and image classification, its image segmentation performance can be influenced (e.g., since the previously validated weights/biases of the existing neural network have been changed), which can thus require another round of extensive image segmentation validation to re-ensure regulatory compliance.

Various embodiments of the subject innovation can address one or more of these technical problems. One or more embodiments described herein include systems, computer-implemented methods, apparatus, and/or computer program products that can facilitate extension of existing neural networks without affecting existing outputs. In various instances, embodiments of the subject innovation can be considered as a computerized tool (e.g., a combination of computer-executable hardware and/or computer-executable software) that can electronically access a neural network that is already trained to perform a given computing task, and that can electronically modify and/or re-configure the neural network so that the neural network is able to perform both the given computing task and another computing task that is different from but related to the given computing task. Furthermore, such a computerized tool can ensure that the performance of the neural network with respect to the given computing task is unchanged, unaffected, and/or undeteriorated by such electronic modification and/or reconfiguration. In other words, when given a neural network that is trained to perform a first computing task, the computerized tool as described herein can facilitate the automation of a second computing task that is different from but related to the first computing task, without the above-described shortcomings (e.g., without excessive consumption of time, memory, and/or resources, and without duplicative re-validation).

In various embodiments, such a computerized tool can comprise a receiver component, an extension component, a training component, and/or an execution component.

In various embodiments, a neural network can comprise a first set of layers that are trained to perform a first computing task. In various cases, the first set of layers can exhibit any suitable neural network architecture. For instance, the first set of layers can include any suitable number of layers, can include any suitable numbers of neurons in various layers (e.g., different layers can have different numbers of neurons), can implement any suitable activation functions (e.g., softmax, hyperbolic tangent), and/ or can implement any suitable inter-neuron connectivity patterns (e.g., forward connections, skip connections, recursive connections).

In various aspects, the first set of layers can be trained (e.g., via supervised training, unsupervised training, and/or reinforcement learning) to receive as input a data candidate and to produce some output based on the data candidate. In various cases, the data candidate can be an image, an audio time-series, and/or any other suitable data that is structured/ organized as one or more scalars, one or more vectors, one or more matrices, and/or one or more tensors. Similarly, in various cases, the output can be one or more scalars, one or more vectors, one or more matrices, and/or one or more tensors. In various aspects, the output can correspond to the first computing task. For instance, if the first computing task is image classification, then the first set of layers can be configured such that the output can be a scalar that indicates a label/classification that characterizes an input image. On the other hand, if the first computing task is image segmentation, then the first set of layers can be configured such that the output can be a matrix that identifies which pixels of an input image belong to which segments/portions of the input image.

In various embodiments, the receiver component can electronically receive and/or otherwise electronically access the neural network. In various cases, the receiver component can electronically retrieve the neural network from any suitable centralized and/or decentralized data structure (e.g., graph data structure, relational data structure, hybrid data structure), whether remote from and/or local to the receiver component. Accordingly, other components of the computerized tool described herein can electronically interact with and/or otherwise have electronic access to the neural network.

In various embodiments, the extension component can electronically modify and/or otherwise electronically reconfigure the architecture of the neural network. Specifically, in various aspects, the extension component can electronically insert into and/or otherwise electronically append to the neural network a second set of layers. In various cases, the second set of layers can exhibit any suitable neural network architecture. For example, the second set of layers can include any suitable number of layers, can include any suitable numbers of neurons in various layers (e.g., different layers can have different numbers of neurons), can implement any suitable activation functions (e.g., softmax, hyperbolic tangent), and/or can implement any suitable inter-neuron connectivity patterns (e.g., forward connections, skip connections, recursive connections). In various aspects, the second set of layers can branch off from the first set of layers, such that the second set of layers can be configured to receive as input latent activations (e.g., one or more activation maps) generated by the first set of layers. Accordingly, the second set of layers can be considered as being arranged in series with a first portion of the first set of layers, and the second set of layers can be considered as being arranged in parallel with a second portion of the first set of layers. In some cases, such insertion of the second set of layers into the neural network can be considered as extending the breadth and/or width of the neural network.

In various embodiments, the training component can electronically train, based on any suitable dataset that is electronically accessible to the receiver component, the second set of layers to perform a second computing task. More specifically, the training component can train (e.g., via supervised training, unsupervised training, and/or reinforcement learning) the second set of layers to receive as input one or more latent activations generated by the first set of layers (e.g., generated by the first portion of the first set of layers) based on an inputted data candidate and to produce some output based on the one or more latent activations. In various cases, the latent activations received by the second set of layers can be one or more scalars, one or more vectors, one or more matrices, and/or one or more tensors generated by the first set of layers (e.g., generated by the first portion of the first set of layers) based on an inputted data candidate. Similarly, in various cases, the output of the second set of layers can be one or more scalars, one or more vectors, one or more matrices, and/or one or more tensors. Just as the output of the first set of layers can correspond to the first computing task, the output of the second set of layers can, in various aspects, correspond to the second computing task.

In various instances, while the training component facilitates training of the second set of layers, the training component can electronically freeze, preserve, and/or otherwise refrain from modifying the first set of layers. That is, in various cases, the training component can update parameters (e.g., weights and/or biases) of the second set of layers via backpropagation and can refrain from updating parameters (e.g., weights and/or biases) of the first set of layers. Because the training component can refrain from altering the parameters of the first set of layers, the performance of the first set of layers can be unchanged and/or unaffected. That is, the level of accuracy and/or precision with which the first set of layers perform the first computing task can be unaffected by training the second set of layers to perform the second computing task.

In various embodiments, after the training component trains the second set of layers, the execution component can electronically execute and/or can otherwise electronically facilitate the execution of the neural network on an inputted data candidate. In various cases, the first portion of the first set of layers can receive the inputted data candidate and can generate one or more latent activations based on the inputted data candidate. In various instances, the second portion of the first set of layers can receive the one or more latent activations and can generate, based on the one or more latent activations, a first output that corresponds to the first computing task. In various aspects, the second set of layers can also receive the one or more latent activations produced by the first portion of the first set of layers and can generate, based on the one or more latent activations, a second output that corresponds to the second computing task. In other words, the neural network can now perform both the first computing task and the second computing task on the inputted data candidate.

Thus, as described herein, various embodiments of the subject innovation can enable an existing neural network that has been trained to perform a given computing task to be automatically extended and/or modified, so that the existing neural network can perform another computing task in addition to the given computing task. In various aspects, the given computing task and the another computing task can be different but nevertheless related to each other. That is, the given computing task and the another computing task can be performable on the same input data (e.g., both performable on an input image, both performable on an input audio time-series). In various instances, this can be facilitated by inserting into the existing neural network an additional set of layers that branch off from an existing set of layers in the existing neural network. In such case, the additional set of layers can receive as input latent activation maps (e.g., hidden activation values) that are generated by some part of the existing set of layers, and the additional set of layers can be arranged in parallel with a remainder of the existing set of layers. In various aspects, the weights and/or biases of the additional set of layers can be trained as desired, and the weights and/or biases of the existing set of layers can be frozen and/or unchanged during such training. Accordingly, the additional set of layers can be trained to perform the another computing task without affecting and/or deteriorating the performance of the existing set of layers with respect to the given computing task.

In various aspects, modifying and/or reconfiguring the existing neural network in this way can cause the existing neural network to perform both the given computing task and the another computing task, while simultaneously causing the existing neural network to have a smaller computational footprint than conventional techniques would allow. That is, two separate neural networks that are trained to independently perform the given computing task and the another computing task would take up more computer memory and/or storage space than the existing neural network as modified and/or reconfigured as described above.

Moreover, in some instances, training the additional set of layers in this way to perform the another computing task can consume fewer resources than would otherwise be consumed by training a completely separate neural network to perform the another computing task. This can be due to the fact that the additional set of layers receive as input the latent activations of the already-trained existing set of layers. In other words, the latent activations of the existing set of layers have already been trained as desired and are being leveraged during training of the additional set of layers. Thus, fewer training epochs and/or less training data can be needed to train the additional set of layers as described herein than would otherwise be needed if conventional techniques were applied. Such reduced consumption of computing resources (e.g., time, memory, processing power) certainly constitutes a concrete and tangible technical improvement.

Furthermore, in various embodiments, any suitable number of additional sets of layers can be inserted and/or appended to the existing neural network in the herein-described manner. That is, if it is desired to modify and/or configure an existing neural network to perform a total of x related computing tasks (for any suitable positive integer x), then various embodiments of the subject innovation can insert into the existing neural network and train x−1 additional set of layers as described herein. Indeed, in various aspects, the herein-described techniques can be implemented any suitable number of times, so as to progressively extend the breadth/width of an existing neural network without affecting and/or deteriorating the performance of the existing neural network. In various cases, when an additional set of layers is inserted so as to branch off from an existing set of layers in the existing neural network, that additional set of layers can be trained while other sets of layers that are already in the existing neural network can be frozen and/or unaltered.

Various embodiments of the subject innovation can be employed to use hardware and/or software to solve problems that are highly technical in nature (e.g., to facilitate extension of existing neural networks without affecting existing outputs), that are not abstract and that cannot be performed as a set of mental acts by a human. Further, some of the processes performed can be performed by a specialized computer (e.g., trained neural networks) for carrying out defined tasks related to extension of existing neural networks without affecting existing outputs. For example, such defined tasks can include: accessing, by a device operatively coupled to a processor, a neural network, wherein the neural network includes a first set of layers trained to perform a first computing task; inserting, by the device, a second set of layers into the neural network, wherein the second set of layers receive as input latent activations from the first set of layers; training, by the device and without changing the first set of layers, the second set of layers to perform a second computing task that is different from the first computing task; and executing, by the device, the neural network on an inputted data candidate, wherein the first set of layers generate a first output corresponding to the first computing task, and wherein the second set of layers generate a second output corresponding to the second computing task. Such defined tasks are not conventionally performed manually by humans. Moreover, neither the human mind nor a human with pen and paper can electronically access an already-trained neural network, electronically insert additional layers into the neural network such that those additional layers receive as input latent activations from existing layers in the neural network, electronically train the additional layers, and/or electronically execute the neural network. Instead, various embodiments of the subject innovation are inherently and inextricably tied to computer technology and cannot be implemented outside of a computing environment (e.g., embodiments of the subject innovation constitute a computerized tool that can automatically insert layers into a neural network such that the inserted layers branch off from existing layers in the neural network and can automatically train the inserted layers while freezing the existing layers of the neural network; such a computerized tool cannot be practicably implemented in any sensible without computers).

Moreover, various embodiments of the subject innovation can provide technical improvements to and solve problems that arise in the field of neural networks. As explained above, a neural network can include a first set of layers that are trained to perform a first computing task. Thus, the neural network can facilitate the automation of the first computing task. In various cases, it can be desired to facilitate the automation of a second computing task that is related to the first computing task (e.g., where the first computing task and the second computing task can be performable on the same type and/or dimensionality of input data). Conventionally, this is done either by training a completely separate neural network from scratch to perform the second computing task, or by completely retraining the existing neural to perform both the first computing task and the second computing task. The former conventional technique results in two independent neural networks that must be separately stored, separately validated, separately deployed, and/or separately monitored, which can result in excessive consumption of computing resources. The latter conventional technique can negatively influence the performance of the neural network with respect to the first computing task, which can result in the need to re-validate the neural network with respect to the first computing task, again consuming excessive computing resources. In any case, the inventors of various embodiments of the subject innovation recognized that conventional techniques fail to leverage and/or otherwise make use of the training that the neural network has already undergone. Specifically, the inventors of various embodiments of the subject innovation recognized that a second set of layers can be appended and/or branched off from the first set of layers of the neural network, such that the second set of layers receive as input latent activations from the first set of layers.

The inventors further realized that such second set of layers can be trained to perform the second computing task while the parameters of the first set of layers are saved, frozen, and/or otherwise preserved. The result can be that the second set of layers are trained to facilitate the second computing task, while the first set of layers perform the first computing task with the same level of accuracy/precision as they did prior to the insertion of the second set of layers. Accordingly, re-validation of the first set of layers with respect to the first computing task can be unnecessary. Moreover, because the second set of layers can receive latent activations from the first set of layers, the second set of layers can be smaller and/or fewer in number than would otherwise be needed if a completely separate neural network were trained to perform the second computing task. That is, because the latent activations of the already-trained first set of layers are being leveraged, fewer computing resources (e.g., fewer layers, fewer epochs, less training data) can be required to train the second set of layers than would be needed conventionally. Furthermore, the first set of layers and the second set of layers can collectively take up less computing memory and can collectively execute in less time than two separately-trained neural networks would Thus, various embodiments of the subject innovation can reduce the consumption of computational resources associated with training a neural network to perform additional computing tasks without negatively affecting computational performance of the neural network. This clearly constitutes a concrete and tangible technical improvement in the field of neural networks.

Furthermore, various embodiments of the subject innovation can control real-world tangible devices based on the disclosed teachings. For example, various embodiments of the subject innovation can electronically access an existing neural network, which can be any suitable combination of tangible computing hardware and/or software. In various instances, embodiments of the subject innovation can electronically modify the architecture of the existing neural network by inserting additional layers into the existing neural network. In various cases, embodiments of the subject innovation can electronically train the additional layers to perform additional computing tasks as desired. In various aspects, embodiments of the subject innovation can electronically execute the neural network after such training.

It should be appreciated that the herein figures and description provide non-limiting examples of the subject innovation.

FIG. 1 illustrates a block diagram of an example, non-limiting system 100 that can facilitate extension of existing neural networks without affecting existing outputs in accordance with one or more embodiments described herein. As shown, a neural network extension system 102 can be electronically integrated, via any suitable wired and/or wireless electronic connection, with a neural network 104.

In various cases, the neural network 104 can comprise a first set of layers 106. In various instances, the first set of layers 106 can exhibit any suitable neural network architecture. For example, the first set of layers 106 can include any suitable number of layers. Moreover, in various cases, various layers in the first set of layers 106 can include any suitable numbers of neurons (e.g., different layers can have different numbers of neurons as each other, different layers can have the same numbers of neurons as each other). In various instances, various neurons in the first set of layers 106 can implement any suitable activation functions (e.g., sigmoid, softmax, hyperbolic tangent, rectified linear unit). In various aspects, the first set of layers 106 can have any suitable connectivity patterns (e.g., forward connections between neurons, skip connections between neurons, recursive connections between neurons). In various aspects, the first set of layers 106 can be configured in any suitable way, such that the first set of layers 106 can receive input data having any suitable dimensionality (e.g., input data can be one or more scalars, one or more vectors, one or more matrices, one or more tensors, and/or any suitable combinations of the aforementioned) and can produce output data having any suitable dimensionality (e.g., output data can be one or more scalars, one or more vectors, one or more matrices, one or more tensors, and/or any suitable combinations of the aforementioned).

In various embodiments, the first set of layers 106 can be trained (e.g. via any suitable training technique such as supervised training, unsupervised training, and/or reinforcement learning) to perform a first computing task. As mentioned above, non-limiting examples of the first computing task can include image/video classification, image/video segmentation, audio classification, audio segmentation, any other suitable type of data classification, any other suitable type of data segmentation, and/or any suitable type of data forecasting.

In various cases, it can be desired to train the neural network 104 to perform other computing tasks that are related to the first computing task (e.g., that are executable on the same type and/or dimensionality of input data as the first computing task). Conventionally, this would be accomplished either by training a separate neural network from scratch or by retraining the neural network 104. In either case, excessive consumption of computational resources can ensue (e.g., creating a separate network from scratch requires additional memory, additional training data, additional time; retraining the neural network 104 requires re-validation of the neural network 104 with respect to the first computing task). As explained herein, the neural network extension system 102 can, in various cases, ameliorate these technical problems.

In various embodiments, the neural network extension system 102 can comprise a processor 108 (e.g., computer processing unit, microprocessor) and a computer-readable memory 110 that is operably and/or operatively and/or communicatively connected/coupled to the processor 108. The computer-readable memory 110 can store computer-executable instructions which, upon execution by the processor 108, can cause the processor 108 and/or other components of the neural network extension system 102 (e.g., receiver component 112, extension component 114, training component 116, execution component 118) to perform one or more acts. In various embodiments, the computer-readable memory 110 can store computer-executable components (e.g., receiver component 112, extension component 114, training component 116, execution component 118), and the processor 108 can execute the computer-executable components.

In various embodiments, the neural network extension system 102 can comprise a receiver component 112. In various aspects, the receiver component 112 can electronically retrieve and/or otherwise electronically access the neural network 104, and/or the training dataset (not shown) on which the first set of layers 106 was trained, from any suitable centralized and/or decentralized data structure (not shown), whether remote from and/or local to the receiver component 112. Accordingly, in various aspects, other components of the neural network extension system 102 can manipulate and/or otherwise interact with the neural network 104 and/or the training dataset on which the first set of layers 106 was trained.

Although not explicitly shown in the figures, the receiver component 112 can, in various embodiments, receive electronic instructions from any suitable computing device and/or from any suitable human-computer-interface device (e.g., keyboard, keypad, touchscreen, voice command). In various aspects, such electronic instructions can identify one or more other computing tasks that are related to the first computing task (e.g., that are performable on the same type and/or dimensionality of input data as the first computing task). As explained herein, the neural network extension system 102 can, in various cases, electronically modify and/or reconfigure the neural network 104 such that the neural network 104 is able to perform the one or more other computing tasks in addition to the first computing task. Moreover, the neural network extension system 102 can, in various aspects, guarantee that the performance of the neural network 104 with respect to the first computing task is unaffected and/or undiminished.

In various embodiments, the neural network extension system 102 can comprise an extension component 114. In various aspects, the extension component 114 can electronically modify and/or electronically reconfigure the neural network 104 based on the electronic instructions received by the receiver component 112. In various instances, if the electronic instructions identify one or more other computing tasks which are desired to be automated by the neural network 104, the extension component 114 can electronically insert into the neural network 104 one or more other sets of layers respectively corresponding to the one or more other computing tasks. In various cases, the extension component 114 can insert the one or more other sets of layers into the neural network 104 such that the one or more other sets of layers branch off from the first set of layers 106. More specifically, in various cases, the one or more other sets of layers can be arranged in series with a first portion of the first set of layers 106 and can be arranged in parallel with a second portion of the first set of layers 106, such that the one or more other sets of layers receive as input latent activations generated by the first portion of the first set of layers 106. In various aspects, the one or more other sets of layers can exhibit any suitable neural network architecture (e.g., any suitable numbers of layers, any suitable numbers of neurons, any suitable activation functions, any suitable connectivity patterns).

In various embodiments, the neural network extension system 102 can comprise a training component 116. In various aspects, the training component 116 can electronically train (e.g., via supervised training, unsupervised training, reinforcement learning) the one or more other sets of layers inserted into the neural network 104 by the extension component 114 to respectively perform the one or more other computing tasks identified by the electronic instructions received by the receiver component 112. In various cases, the training component 116 can facilitate such training on any suitable training datasets (not shown) that are electronically accessible to the receiver component 112. In various cases, the training component 116 can implement backpropagation to iteratively update weight values and/or bias values of the one or more other sets of layers until any suitable convergence criteria are met. During such training, the training component 116 can electronically preserve, electronically freeze, and/or otherwise electronically save the first set of layers 106. In other words, the training component 116 can refrain from iteratively updating weight values and/or bias values of the first set of layers 106. Accordingly, the one or more other sets of layers can be trained to respectively perform the one or more other computing tasks while the first set of layers 106 remain unchanged, meaning that the performance of the first set of layers 106 with respect to the first computing task can be undiminished and/or unaffected.

In various embodiments, the neural network extension system 102 can comprise an execution component 118. In various aspects, the execution component 118 can electronically execute the neural network 104 on any suitable inputted data candidate, after the training component 116 completes training of the one or more other sets of layers. In various instances, this can cause the first portion of the first set of layers 106 to receive the inputted data candidate and to produce latent activations based on the inputted data candidate. In various cases, the second portion of the first set of layers 106 can receive the latent activations from the first portion of the first set of layers 106 and can produce a first output that corresponds to the first computing task. Additionally, the one or more other layers can receive the latent activations from the first portion of the first set of layers 106 and can respectively produce one or more other outputs that respectively correspond to the one or more other computing tasks.

In this way, the neural network can facilitate automation of the first computing task and the one or more other computing tasks. Moreover, because the first set of layers 106 are not changed by the training component 116, the performance of the neural network 104 with respect to the first computing task can be unchanged and/or undiminished by the insertion and training of the one or more other sets of layers.

Figure 2:
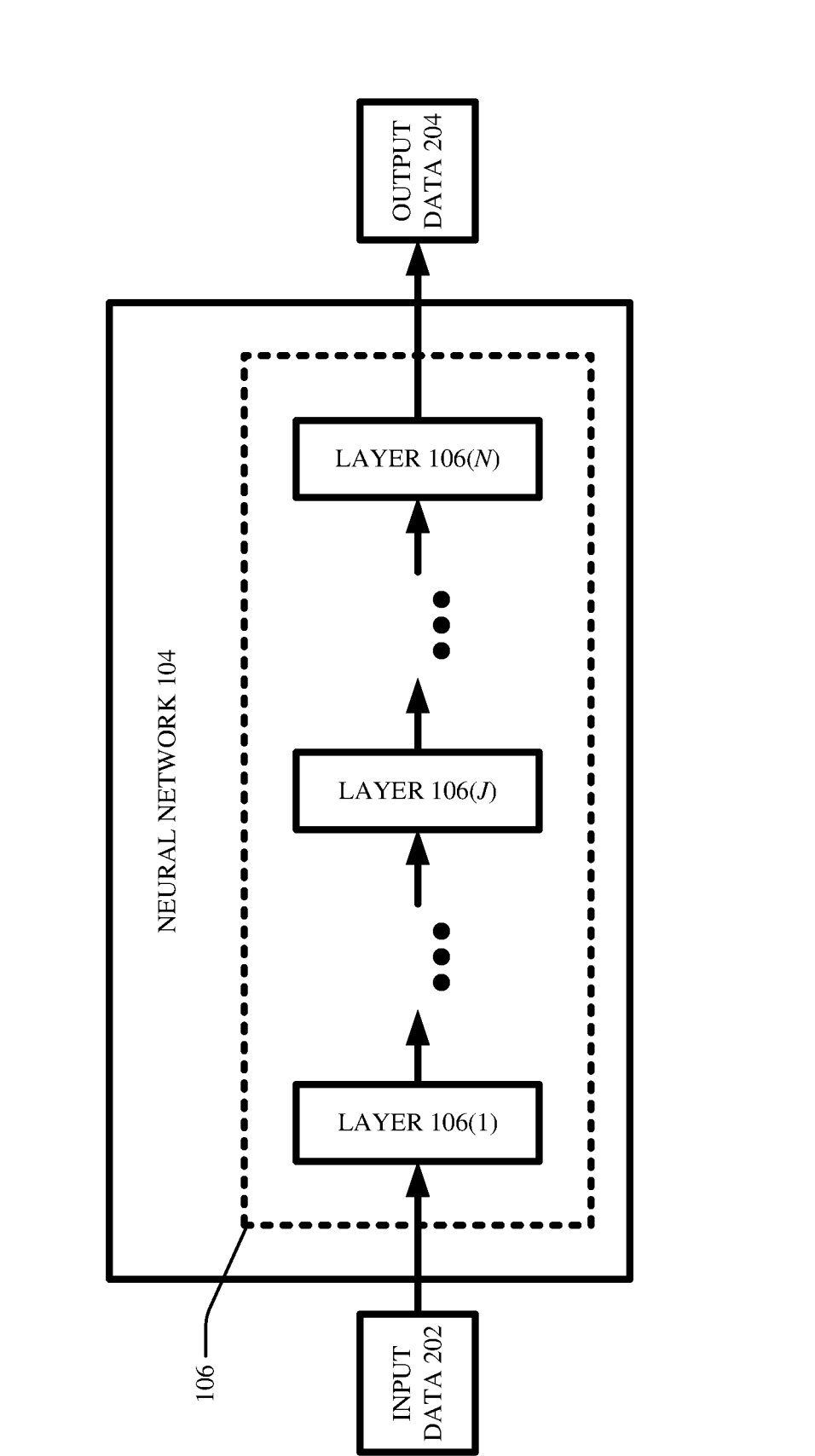
FIG. 2 illustrates a block diagram of an example, non-limiting neural network having a first set of layers in accordance with one or more embodiments described herein.

FIG. 2 illustrates a block diagram of an example, non-limiting neural network having a first set of layers in accordance with one or more embodiments described herein. In other words, FIG. 2 depicts a non-limiting example of the neural network 104 and the first set of layers 106.

As mentioned above, the neural network 104 can comprise the first set of layers 106. As shown, the first set of layers 106 can, in various embodiments, comprise n layers, for any suitable positive integer n: that is, layer 106(1) to layer 106($n$). In various cases, an intermediate layer in the first set of layers 106 can be represented as the intermediate layer 106($j$), where j can be any suitable positive integer greater than 1 and less than n. As mentioned above, each layer of the first set of layers 106 can have any suitable number of neurons, can implement any suitable types of activation functions, and/or can be connected to other layers via any suitable connectivity pattern.

In various embodiments, the neural network 104 can receive input data 202 and can generate output data 204 based on the input data 202. More specifically, the layer 106(1) can receive the input data 202 and can generate various latent activations (e.g., can generate one or more latent activation maps) based on the input data 202. In various cases, the latent activations generated by the layer 106(1) can be received by a next layer 106(2) (not shown). Based on the latent activations provided by the layer 106(1), the layer 106(2) can generate its own latent activations, which can then be received by a next layer 106(3) (not shown). Similarly, the layer 106($j$) can receive latent activations generated by a previous layer 106(j−1) (not shown) and can generate its own latent activations based on the latent activations received from the previous layer 106(j−1). In various cases, a next layer 106(j+1) (not shown) can then receive the latent activations produced by the layer 106($j$). Likewise, the layer 106($n$) can receive latent activations generated by a previous layer 106(n−1) (not shown) and can generate the output data 204 based on the latent activations of the previous layer 106(n−1).

In various embodiments, the input data 202 can exhibit any suitable dimensionality (e.g., the input data 202 can be one or more scalars, one or more vectors, one or more matrices, one or more tensors, and/or any suitable combination thereof). Similarly, in various aspects, the output data 204 can exhibit any suitable dimensionality. Moreover, in various cases, the latent activations generated by the layers of the first set of layers 106 can exhibit any suitable dimensionalities. Indeed, those having ordinary skill in the art will appreciate that the dimensionality of a latent activation map can depend upon the number and/or arrangement of neurons in the layer that generates the latent activation map (e.g., different layers can have different numbers of neurons and thus can generate different latent activations having different dimensionalities).

Figure 3:
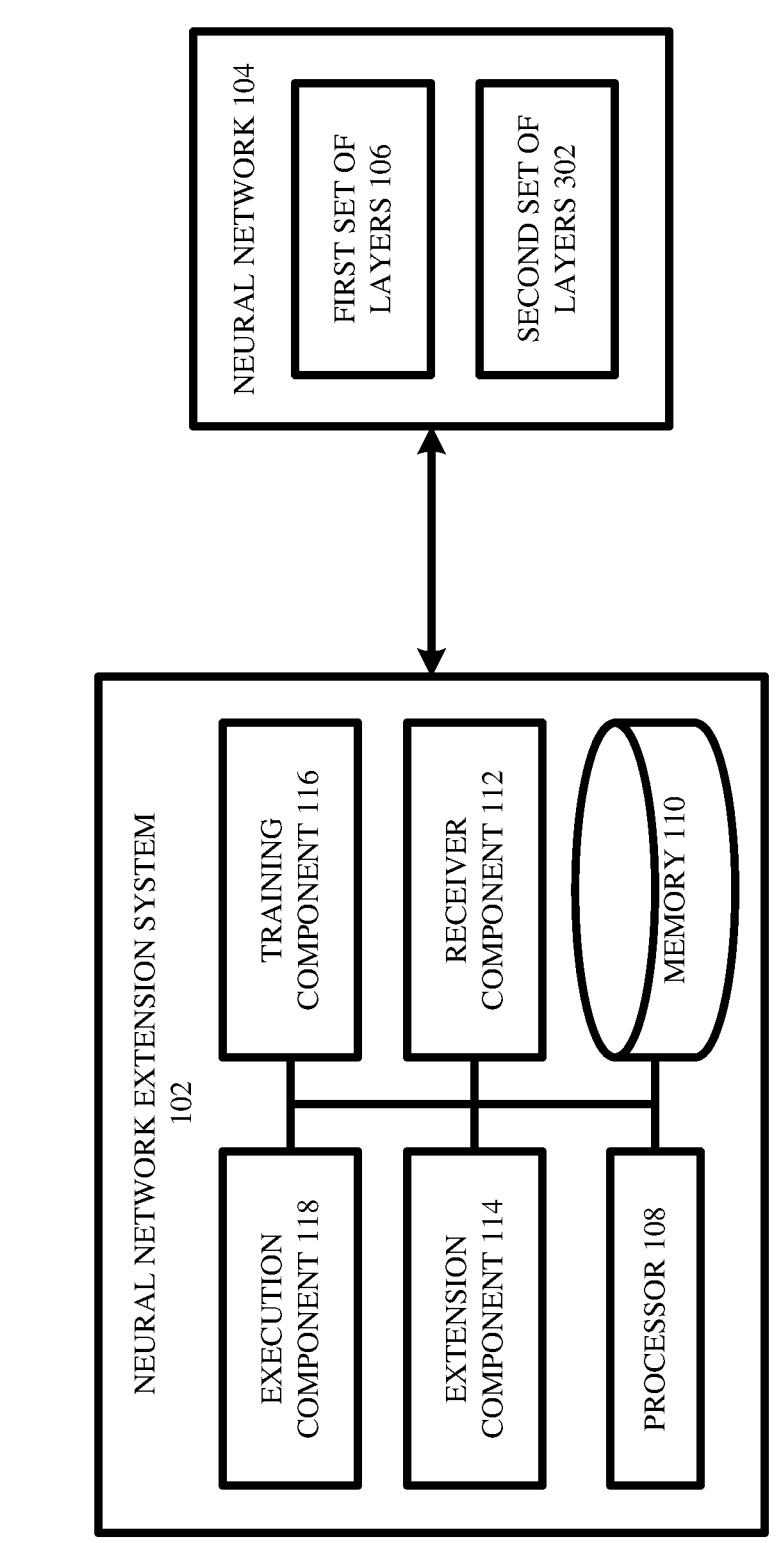
FIG. 3 illustrates a block diagram of an example, non-limiting system that facilitates extension of existing neural networks without affecting existing outputs in accordance with one or more embodiments described herein.

FIG. 3 illustrates a block diagram of an example, non-limiting system 300 that can facilitate extension of existing neural networks without affecting existing outputs in accordance with one or more embodiments described herein. As shown, the system 300 can, in some cases, comprise the same components as the system 100, and can further comprise a second set of layers 302.

As explained above, the first set of layers 106 can be trained to perform the first computing task. In various embodiments, the receiver component 112 can receive, retrieve, and/or otherwise access electronic instructions (not shown), which electronic instructions can identify a second computing task which is desired to be automated by the neural network 104. Based on this information contained within the electronic instructions, the extension component 114 can electronically insert the second set of layers 302 into the neural network 104. More specifically, the extension component 114 can append the second set of layers 302 to the first set of layers 106, such that the second set of layers 302 branch off from the first set of layers 106. This is shown and explained in more detail with respect to FIG. 4.

Figure 4:
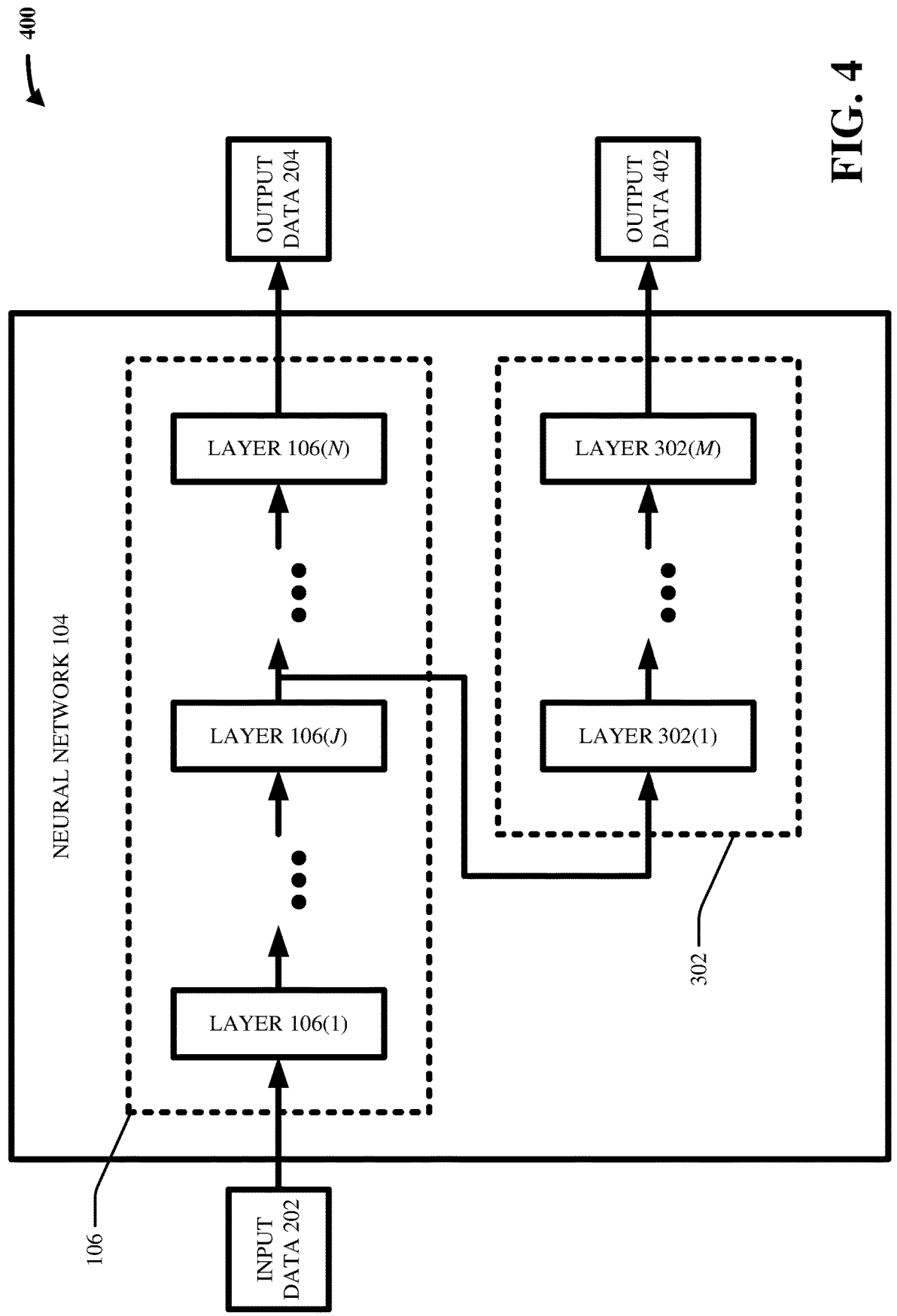
FIG. 4 illustrates a block diagram of an example, non-limiting neural network having a first set of layers and a second set of layers in accordance with one or more embodiments described herein.

FIG. 4 illustrates a block diagram of an example, non-limiting neural network having a first set of layers and a second set of layers in accordance with one or more embodiments described herein. In other words, FIG. 4 depicts a non-limiting example of the neural network 104 after the extension component 114 inserts the second set of layers 302.

As shown, in various embodiments, the extension component 114 can insert, add, and/or append the second set of layers 302 to the neural network 104, such that the second set of layers 302 branch off from the first set of layers 106. As shown, the second set of layers 302 can, in various embodiments, comprise m layers, for any suitable positive integer m: that is, layer 302(1) to layer 302(m). In various aspects, each layer of the second set of layers 302 can have any suitable number of neurons, can implement any suitable types of activation functions, and/or can be connected to other layers via any suitable connectivity pattern.

In the non-limiting example depicted in FIG. 4, the extension component 114 can electronically configure the second set of layers 302 such that the second set of layers 302 receive latent activations generated by the first set of layers 106. As mentioned above, the layer 106(1) can receive the input data 202, which can cause the intermediate layer 106(j) to produce latent activations, and which can ultimately cause the layer 106(n) to produce the output data 204. However, as shown, the second set of layers 302 can, in various instances, receive as input the latent activations generated by the intermediate layer 106(j). More specifically, the layer 302(1) can receive the latent activations produced by the intermediate layer 106(j), and the layer 302(1) can generate its own latent activations based on the latent activations of the intermediate layer 106(j). In various cases, the latent activations generated by the layer 302(1) can be received by a next layer 302(2) (not shown). Based on the latent activations provided by the layer 302(1), the layer 302(2) can generate its own latent activations, which can then be received by a next layer 302(3) (not shown). Likewise, the layer 302(m) can receive latent activations generated by a previous layer 302(m−1) (not shown) and can generate output data 402 based on the latent activations of the previous layer 302(m−1).

In various embodiments, the first set of layers 106 can be considered as comprising two portions/segments: a first portion/segment that includes the layer 106(1) to the intermediate layer 106(j), and a second portion/segment that includes the layer 106(j+1) to the layer 106(n). In various instances, the second set of layers 302 can be considered as being arranged in series with the first portion/segment of the first set of layers 106, and the second set of layers 302 can be considered as being arranged in parallel with the second portion/segment of the first set of layers 106. In various aspects, as shown, the branching architecture depicted in FIG. 4 can be considered as widening and/or extending the breadth of the neural network 104.

In various embodiments, the training component 116 can electronically train (e.g., via any suitable training technique) the second set of layers 302 to perform the second computing task, and such training can be based on any suitable training dataset (not shown) which is electronically accessible to the receiver component 112. As mentioned above, the training component 116 can facilitate such training of the second set of layers 302 by freezing the parameters of the first set of layers 106. More specifically, during such training, the training component 116 can feed a training data candidate to the layer 106(1) (e.g., the input data 202 can, in some embodiments, come from a training dataset). This can cause the intermediate layer 106(j) to produce latent activations, which can ultimately cause the layer 106(n) to generate an output that corresponds to the first computing task (e.g., the output data 204). In various instances, the layer 302(1) can receive the latent activations produced by the intermediate layer 106(j), which can ultimately cause the layer 302(m) to generate an output that corresponds to the second computing task (e.g., the output data 402). In various instances, the training component 116 can compute an error and/or loss associated with the output of the layer 302(m) (e.g., the training dataset can be annotated with known classifications and/or known segmentations), and, based on such error and/or loss, the training component 116 can utilize backpropagation to iteratively update the parameters of the second set of layers 302 (e.g., iteratively updating the weights and/or biases of the layer 302(1) to the layer 302(m)). In various cases, the training component 116 can refrain from updating the parameters of the first set of layers 106 (e.g., can refrain from iteratively updating the weights and/or biases of the layer 106(1) to the layer 106(n)).

In this way, the second set of layers 302 can be configured to accurately perform the second computing task, and the performance of the first set of layers 106 with respect to the first computing task can remain unchanged and/or unaffected. This can be beneficial, because it can eliminate the need to re-validate the performance of the first set of layers 106 with respect to the first computing task. More specifically, applicable regulations (e.g., such as in the healthcare and/or medical field) can require that a neural network meet a threshold level of performance before being deployed. It can be the case that the first set of layers 106 have already been subjected to validation to ensure that the first set of layers 106 meet such threshold level of performance. If the parameters of the first set of layers 106 are changed after such validation, then the applicable regulations can require that the first set of layers 106 be subjected to re-validation to ensure that the first set of layers 106 still meet the threshold level of performance. Such re-validation can represent redundant and/or repetitive consumption of time and/or resources (e.g., the time and/or resources spent during the first validation of the first set of layers 106 can be considered as wasted if the first set of layers 106 need to be re-validated). Because the training component 116 can refrain from changing the parameters of the first set of layers 106 (e.g., because the training component 116 can freeze the first set of layers 106 while training the second set of layers 302), the performance of the first set of layers 106 can remain unchanged, and thus no costly re-validation of the first set of layers 106 can be needed. This is a concrete and tangible benefit in the field of neural networks.

Moreover, in various instances, the non-limiting and example architecture depicted in FIG. 4 can be considered as cleverly leveraging the first portion/segment of the first set of layers 106. As mentioned above, the first portion/segment of the first set of layers 106 can include the layer 106(1) to the intermediate layer 106(j). In various aspects, because the first portion/segment of the first set of layers 106 can be already trained, and because the second set of layers 302 can receive as input the latent activations generated by the first portion/segment of the first set of layers 106, the size of the second set of layers 302 can be less than the size of a completely separate neural network trained to perform the second computing task with comparable accuracy/precision. In other words, m can be less (e.g., significantly less, in some cases) than the number of layers which a completely separate neural network would have needed to automate the performance of the second computing task with comparable accuracy/precision. In still other words, the first portion/ segment of the first set of layers 106 can be considered as facilitating an encoding function, and the second set of layers 302 can omit layers designed to facilitate such an encoding function because the second set of layers 302 can make use of the first portion/segment of the first set of layers 106. Ultimately, this means that the amount of time and/or resources spent training the second set of layers 302 can be less (e.g., significantly less, in some cases) than the amount of time and/or resources that would have been spent training a completely separate neural network to perform the second computing task with comparable accuracy/precision. This is another concrete and tangible technical improvement in the field of neural networks.

Once the second set of layers 302 have been trained by the training component 116, the execution component 118 can electronically execute the neural network 104 on any suitable inputted data candidate. More specifically, the execution component 118 can feed an inputted data candidate (e.g., 202) to the layer 106(1), which can cause the intermediate layer 106(j) to generate latent activations, which can ultimately cause the layer 106(n) to generate output (e.g., 204) corresponding to the first computing task. Moreover, in various aspects, the latent activations of the intermediate layer 106(j) can be fed to the layer 302(1), which can ultimately cause the layer 302(m) to generate output (e.g., 402) corresponding to the second computing task.

In various aspects, the above discussion explains how the second set of layers 302 can be inserted into the neural network 104, so as to enable the neural network 104 to perform the second computing task. However, in various cases, any suitable number of other sets of layers can be inserted into the neural network 104 as described herein, so as to enable the neural network 104 to perform any suitable number of computing tasks. For instance, FIGS. 5-6, which are analogous to FIGS. 3-4, illustrate how a third set of layers can be inserted into the neural network 104 so as to enable the neural network 104 to perform a third computing task.

Figure 5:
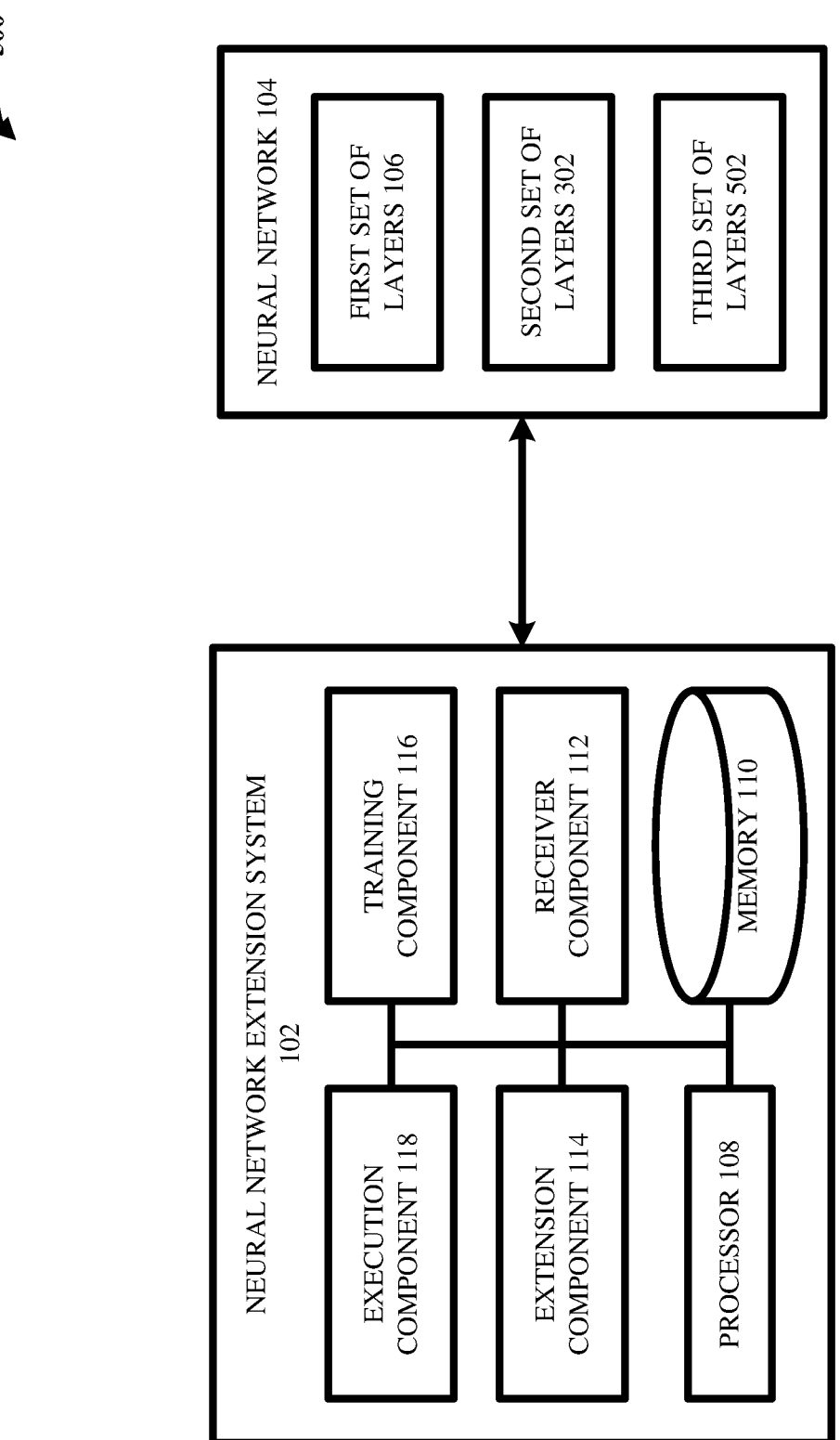
FIG. 5 illustrates a block diagram of an example, non-limiting system that facilitates extension of existing neural networks without affecting existing outputs in accordance with one or more embodiments described herein.

FIG. 5 illustrates a block diagram of an example, non-limiting system 500 that can facilitate extension of existing neural networks without affecting existing outputs in accordance with one or more embodiments described herein. As shown, the system 500 can, in some cases, comprise the same components as the system 300, and can further comprise a third set of layers 502.

As explained above, the first set of layers 106 can be trained to perform the first computing task, and the second set of layers 302 can be trained to perform the second computing task. In various embodiments, the receiver component 112 can receive, retrieve, and/or otherwise access electronic instructions (not shown), which electronic instructions can identify a third computing task which is desired to be automated by the neural network 104. Based on this information contained within the electronic instructions, the extension component 114 can electronically insert the third set of layers 502 into the neural network 104. More specifically, the extension component 114 can append the third set of layers 502 to the first set of layers 106 and/or to the second set of layers 302, such that the third set of layers 502 branch off from the first set of layers 106 and/or from the second set of layers 302. This is shown and explained in more detail with respect to FIG. 6.

Figure 6:
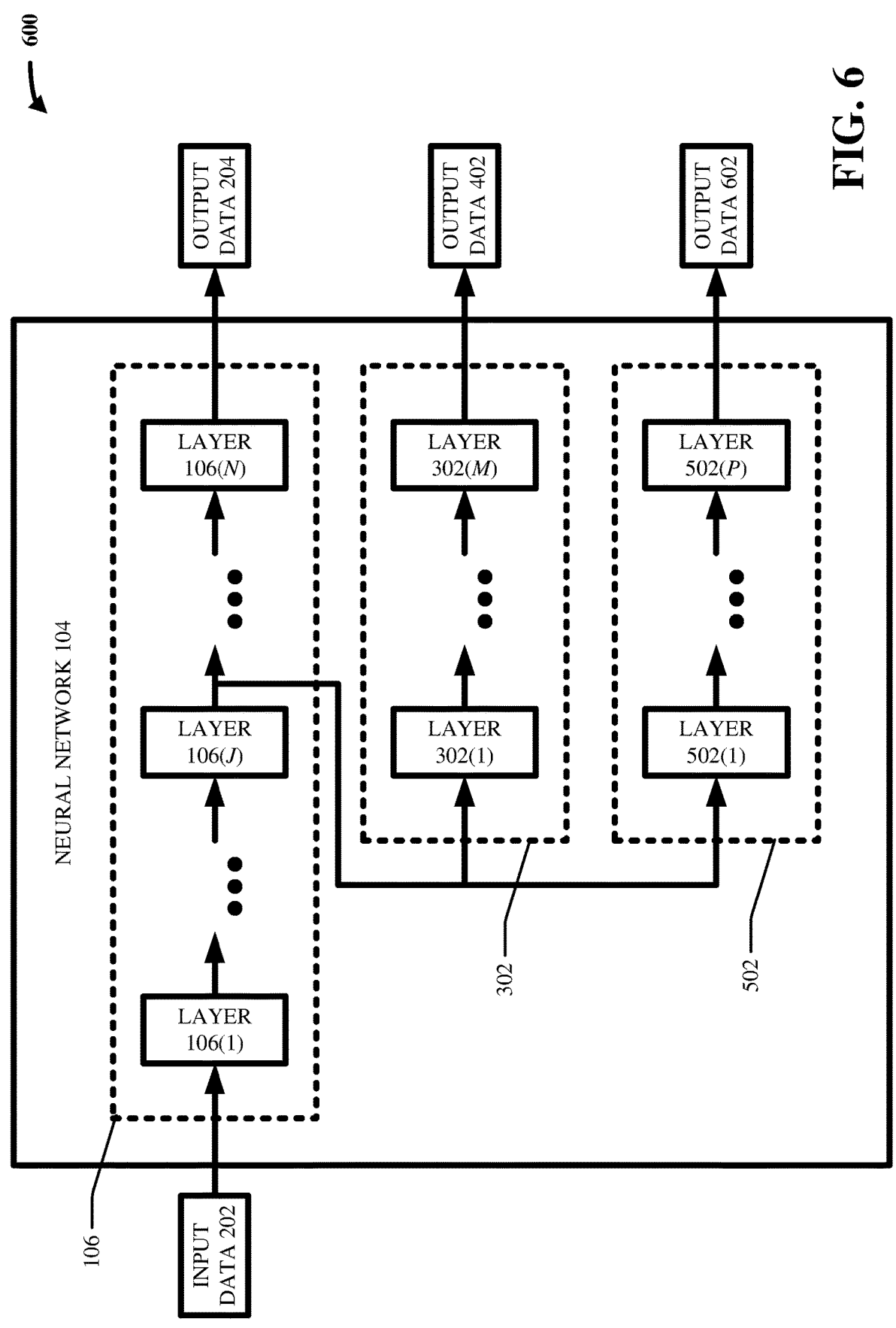
FIG. 6 illustrates a block diagram of an example, non-limiting neural network having a first set of layers, a second set of layers, and a third set of layers in accordance with one or more embodiments described herein.

FIG. 6 illustrates a block diagram of an example, non-limiting neural network having a first set of layers, a second set of layers, and a third set of layers in accordance with one or more embodiments described herein. In other words, FIG. 6 depicts a non-limiting example of the neural network 104 after the extension component 114 inserts the third set of layers 502.

As shown, in various embodiments, the extension component 114 can insert, add, and/or append the third set of layers 502 to the neural network 104, such that the third set of layers 502 branch off from the first set of layers 106. In the non-limiting example shown in FIG. 6, the third set of layers 502 can branch off from the first set of layers 106 at the same location at which the second set of layers 302 branch off from the first set of layers 106. However, this is a mere non-limiting example. Those having ordinary skill in the art will appreciate that the third set of layers 502 can branch off from the first set of layers 106 at any other location (e.g., after any other layer). Although not explicitly shown in FIG. 6, in some cases, the third set of layers 502 can branch off from the second set of layers 302 instead of from the first set of layers 106. As shown, the third set of layers 502 can, in various embodiments, comprise p layers, for any suitable positive integer p: that is, layer 502(1) to layer 502(p). In various aspects, each layer of the third set of layers 502 can have any suitable number of neurons, can implement any suitable types of activation functions, and/or can be connected to other layers via any suitable connectivity pattern.

In the non-limiting example depicted in FIG. 6, the extension component 114 can electronically configure the third set of layers 502 such that the third set of layers 502 receive latent activations generated by the first set of layers

106. As mentioned above, the layer 106(1) can receive the input data 202, which can cause the intermediate layer 106(j) to produce latent activations, and which can ultimately cause the layer 106(n) to produce the output data 204. Moreover, the layer 302(1) can receive the latent activations produced by the intermediate layer 106(j), which can ultimately cause the layer 302(m) to produce the output data 402. As shown, the third set of layers 502 can, in various instances, receive as input the latent activations generated by the intermediate layer 106(j). More specifically, the layer 502(1) can receive the latent activations produced by the intermediate layer 106(j), and the layer 502(1) can generate its own latent activations based on the latent activations of the intermediate layer 106(j). In various cases, the latent activations generated by the layer 502(1) can be received by a next layer 502(2) (not shown). Based on the latent activations provided by the layer 502(1), the layer 502(2) can generate its own latent activations, which can then be received by a next layer 502(3) (not shown). Likewise, the layer 502(p) can receive latent activations generated by a previous layer 502(p–1) (not shown) and can generate output data 602 based on the latent activations of the previous layer 502(p–1).

As mentioned above, in various embodiments, the first set of layers 106 can be considered as comprising a first portion/segment that includes the layer 106(1) to the intermediate layer 106(j), and comprising a second portion/ segment that includes the layer 106(j+1) to the layer 106(n). In various instances, the third set of layers 502 can be considered as being arranged in series with the first portion/ segment of the first set of layers 106, and the third set of layers 502 can be considered as being arranged in parallel with the second portion/segment of the first set of layers 106. In various cases, the third set of layers 502 can also be considered as being arranged in parallel with the second set of layers 302. Again, as shown, the branching architecture depicted in FIG. 6 can be considered as widening and/or extending the breadth of the neural network 104.

In various embodiments, the training component 116 can electronically train (e.g., via any suitable training technique) the third set of layers 502 to perform the third computing task, and such training can be based on any suitable training dataset (not shown) which is electronically accessible to the receiver component 112. In various aspects, the training component 116 can facilitate such training of the third set of layers 302 by freezing the parameters of the first set of layers 106 and by freezing the parameters of the second set of layers 302. More specifically, during such training, the training component 116 can feed a training data candidate to the layer 106(1) (e.g., the input data 202 can, in some embodiments, come from a training dataset). This can cause the intermediate layer 106(j) to produce latent activations, and which can ultimately cause the layer 106(n) to generate an output that corresponds to the first computing task (e.g., the output data 204). As explained above, the layer 302(1) can, in various cases, receive the latent activations produced by the intermediate layer 106(j), which can ultimately cause the layer 302(m) to generate an output that corresponds to the second computing task (e.g., the output data 402). Moreover, in various instances, the layer 502(1) can, in various cases, receive the latent activations produced by the intermediate layer 106(j), which can ultimately cause the layer 502(p) to generate an output that corresponds to the third computing task (e.g., the output data 602). In various instances, the training component 116 can compute an error and/or loss associated with the output of the layer 502(p) (e.g., the training dataset can be annotated with known classifications and/or known segmentations), and, based on such error and/or loss, the training component 116 can utilize backpropagation to iteratively update the parameters of the third set of layers 502 (e.g., iteratively updating the weights and/or biases of the layer 502(1) to the layer 502(p)). In various cases, the training component 116 can refrain from updating the parameters of the first set of layers 106 (e.g., can refrain from iteratively updating the weights and/or biases of the layer 106(1) to the layer 106(n)). Similarly, in various cases, the training component 116 can refrain from updating the parameters of the second set of layers 302 (e.g., can refrain from iteratively updating the weights and/or biases of the layer 301(1) to the layer 302(m)).

In this way, the third set of layers 502 can be configured to accurately perform the third computing task, and the performance of the first set of layers 106 with respect to the first computing task and the performance of the second set of layers 302 with respect to the second computing task can remain unchanged and/or unaffected. As explained above, this can be beneficial, because it can eliminate the need to re-validate the performance of the first set of layers 106 with respect to the first computing task and/or to re-validate the performance of the second set of layers 302 with respect to the second computing task. Moreover, as explained above, the non-limiting and example architecture depicted in FIG. 6 can be considered as cleverly leveraging the first portion/ segment of the first set of layers 106 so as to reduce an amount of time and/or resources needed to train the third set of layers 502.

Once the third set of layers 502 have been trained by the training component 116, the execution component 118 can electronically execute the neural network 104 on any suitable inputted data candidate. More specifically, the execution component 118 can feed an inputted data candidate (e.g., 202) to the layer 106(1), which can cause the intermediate layer 106(j) to generate latent activations, which can ultimately cause the layer 106(n) to generate output (e.g., 204) corresponding to the first computing task. Moreover, in various aspects, the latent activations of the intermediate layer 106(j) can be fed to the layer 302(1), which can ultimately cause the layer 302(m) to generate output (e.g., 402) corresponding to the second computing task. Furthermore, in various instances, the latent activations of the intermediate layer 106(j) can be fed to the layer 502(1), which can ultimately cause the layer 502(p) to generate output (e.g., 602) corresponding to the third computing task.

In this way, the neural network 104 can be progressively extended and/or widened so as to facilitate the automation of any suitable number of computing tasks (e.g., progressive extension from one computing task to two computing tasks to three computing tasks is shown in the figures, but this is a mere non-limiting example).

What follows is a brief discussion of a particular non-limiting embodiment which the inventors of various embodiments of subject innovation created reduced to practice during various experiments. In various cases, the inventors trained a neural network to perform biomedical image segmentation. Specifically, the neural network was structured as a U-Net that comprised an encoder portion and a decoder portion coupled in series. The encoder portion included a series of down-sampling layers (e.g., convolutions) separated by rectified linear units and/or max pooling layers, and the decoder portion included a series of up-sampling layers (e.g., up-convolutions) separated by rectified linear units and/or max pooling layers. The inventors trained the neural network to perform anatomy segmentation on the right upper quadrant of a patient's abdomen. In other words, the neural network could receive as input an MRI image of the right upper quadrant of a patient's abdomen, and the neural network could generate as output a pixel-wise mask identifying where various key anatomical structures are depicted in the MRI image.

The inventors desired to modify and/or reconfigure the neural network to perform biomedical image detection as well as biomedical image segmentation. That is, the inventors wanted the neural network to be able to detect whether a given MRI image depicts the right upper quadrant of a patient's abdomen (e.g., because the neural network was trained to identify/segment key anatomies in the right upper quadrant of an abdomen, the neural network's segmentation results would be meaningless if based on a non-right upper quadrant region).

To achieve this, a second set of layers were inserted into the neural network, such that the second set of layers were arranged in series with the encoder portion of the neural network and such that the second set of layers were arranged in parallel with the decoder portion of the neural network. That is, the second set of layers were configured to receive as input the latent activations generated by the encoder portion. Supervised training was then performed on this second set of layers. Such supervised training was based on a collection of MRI images, some which depicted the right upper quadrant of an abdomen, some of which depicted a sub-xiphoid view, and some of which depicted a probe in the air. During such training, the parameters of the encoder portion and the decoder portion were frozen and/or preserved, while the parameters of the second set of layers were iteratively updated via backpropagation. The result was that the neural network was now able to perform both biomedical image segmentation and biomedical image detection (e.g., the neural network would segment key anatomies in a given MRI image, and the neural network would also generate an output indicating a probability that the given MRI image depicts the right upper quadrant of an abdomen). Moreover, the performance metrics (e.g., accuracy and/or precision) of the neural network with respect to biomedical image segmentation were completely unchanged.

The inventors further desired to modify and/or reconfigure the neural network to perform anatomy orientation detection as well as both biomedical image segmentation and biomedical image detection. That is, the inventors wanted the neural network to be able to determine an orientation of the anatomical structures depicted in a given MRI image.

To achieve this, a third set of layers were inserted into the neural network, such that the third set of layers were arranged in series with the encoder portion of the neural network, such that the third set of layers were arranged in parallel with the decoder portion of the neural network, an such that the third set of layers were also arranged in parallel with the second set of layers that were trained to perform biomedical image detection. That is, the third set of layers were configured to receive as input the latent activations generated by the encoder portion. Supervised training was then performed on this third set of layers. Such supervised training was based on the collection of MRI images mentioned above. During such training, the parameters of the encoder portion, the parameters of the decoder portion, and the parameters of the second set of layers trained to perform biomedical image detection were frozen and/or preserved, while the parameters of the third set of layers were iteratively updated via backpropagation. The result was that the neural network was now able to perform biomedical image segmentation, biomedical image detection, and anatomy orientation detection (e.g., the neural network would segment key anatomies in a given MRI image, the neural network would generate an output indicating a probability that the given MRI image depicts the right upper quadrant of an abdomen, and the neural network would generate an output indicating likely orientations of the depicted anatomical structures). Moreover, the performance metrics (e.g., accuracy and/or precision) of the neural network with respect to biomedical image segmentation and biomedical image detection were completely unchanged.

Such reduction to practice helps to demonstrate the benefits of various embodiments of the subject innovation.

FIG. 7 illustrates a flow diagram of an example, non-limiting computer-implemented method 700 that can facilitate extension of existing neural networks without affecting existing outputs in accordance with one or more embodiments described herein. In various aspects, the computer-implemented method 700 can be implemented by the neural network extension system 102.

In various embodiments, act 702 can include receiving, by a device (e.g., 112) operatively coupled to a processor, a neural network (e.g., 104) having a first set of layers (e.g., 106) trained to perform a first computing task.

In various aspects, act 704 can include initializing, by the device (e.g., 112), an index i to be equal to 2.

In various instances, act 706 can include installing, by the device (e.g., 114), an i-th set of layers (e.g., 302 and/or 502) into the neural network, such that the i-th set of layers branch off from some other set of layers in the neural network (e.g., as shown and explained with respect to FIGS. 4 and 6).

In various cases, act 708 can include training, by the device (e.g., 116), the i-th set of layers to perform an i-th computing task, while freezing parameters of all other sets of layers in the neural network.

In various aspects, act 710 can include determining, by the device (e.g., 112), whether to add another set of layers to the neural network. If yes, the computer-implemented method 700 can proceed to act 712. If not, the computer-implemented method 700 can instead proceed to act 714.

In various instances, act 712 can include incrementing, by the device (e.g., 112), the index i and proceeding back to act 706. In other words, another set of layers can be inserted and/or installed into the neural network for as many additional computing tasks that it is desired to automate via the neural network.

In various cases, act 714 can include ending and/or exiting the computer-implemented method 700.

FIG. 8 illustrates a flow diagram of an example, non-limiting computer-implemented method 800 that can facilitate extension of existing neural networks without affecting existing outputs in accordance with one or more embodiments described herein. In various cases, the computer-implemented method 800 can be implemented by the neural network extension system 102.

In various embodiments, act 802 can comprise accessing, by a device (e.g., 112) operatively coupled to a processor, a neural network (e.g., 104), wherein the neural network includes a first set of layers (e.g., 106) trained to perform a first computing task.

In various aspects, act 804 can include inserting, by the device (e.g., 114), a second set of layers (e.g., 302) into the neural network, wherein the second set of layers receive as input latent activations from the first set of layers.

In various instances, act 806 can include training, by the device (e.g., 116) and without changing the first set of layers, the second set of layers to perform a second computing task that is different from the first computing task.

In various cases, act 808 can include executing, by the device (e.g., 118), the neural network on an inputted data candidate (e.g., 202), wherein the first set of layers generate a first output (e.g., 204) corresponding to the first computing task, and wherein the second set of layers generate a second output (e.g., 402) corresponding to the second computing task.

Although not explicitly shown in FIG. 8, the computer-implemented method 800 can further comprise: during the training of the second set of layers, iteratively updating, by the device (e.g., 116), parameters (e.g., weights and/or biases) of the second set of layers via backpropagation.

Although not explicitly shown in FIG. 8, the computer-implemented method 800 can further comprise: during the training of the second set of layers, freezing, by the device (e.g., 116), parameters (e.g., weights and/or biases) of the first set of layers.

Although not explicitly shown in FIG. 8, the first set of layers can be a U-Net that includes an encoder portion and a decoder portion, and the latent activations can be generated by the encoder portion.

Although not explicitly shown in FIG. 8, the second set of layers can execute in parallel with the decoder portion.

Although not explicitly shown in FIG. 8, the first computing task can be image segmentation, and the second computing task can be image detection or image orientation detection.

Various embodiments of the subject innovation can take the form of a computerized tool that can electronically modify and/or re-configure an existing neural network to perform additional computing tasks, without affecting how the neural network performs existing computing tasks. Such a computerized tool can accomplish this by electronically accessing and/or retrieving an existing neural network, where the existing neural network includes a first set of layers trained to perform a first computing task. For each additional computing task that is desired to be automated, the computerized tool can insert an additional set of layers into the existing neural network, such that the additional set of layers receive as input latent activations of the first set of layers (e.g., such that the additional set of layers branch off from the first set of layers). In various cases, the computerized tool can train the additional set of layers on any suitable dataset to perform the desired computing task. During such training, the parameters of the first set of layers can remain frozen and/or unchanged. The result can be that the existing neural network is now able to perform both the first computing task and the additional computing task. Moreover, the accuracy and/or precision with which the existing neural network performs the first computing task can be unchanged and/or undiminished. Furthermore, training of the additional set of layers in this manner can consume fewer computational resources than would otherwise be needed to train from scratch a completely separate neural network to perform the additional computing task (e.g., because the latent activations from the already-trained first set of layers are fed as input to the additional set of layers, training of the additional set of layers can require fewer epochs and/or less data than would conventionally be needed). Further still, the existing neural network can exhibit a smaller computational footprint (e.g., reduced memory requirements and/or reduced processing time requirements) as compared to two separate neural networks trained to independently perform the first computing task and the additional computing task (e.g., as mentioned above, some portion of the first set of layers is being utilized for both the first computing task and the additional computing task; if two separate networks were used instead, that portion of the first set of layers would essentially be duplicated, which would be computationally wasteful).

In various cases, the techniques described herein can enable an existing neural network to be progressively extended so as to automate new computing tasks as desired. In other words, various embodiments of the subject innovation can provide techniques by which an existing neural network can be flexibly modified to exhibit new functionality as desired without negatively affecting its existing functionality. Moreover, various embodiments of the subject innovation can help to reduce an amount of effort needed to collect and/or annotate training data. Specifically, because the existing neural network can be progressively extended on a task-wise basis, training data can likewise be collected and/or annotated on a task-wise basis. In other words, annotations can be obtained independently for each of the desired computing tasks (e.g., the training of the additional set of layers does not affect the first set of layers, and so different annotations can be used to train the additional set of layers than were used to train the first set of layers).

Although the herein disclosure mainly discusses various embodiments of the subject innovation that apply to neural networks, these are mere non-limiting examples. Those having ordinary skill in the art will appreciate that the herein-described teachings can be applied to any suitable machine learning model, whether or not structured as a neural network, such that the machine learning model can be progressively extended as desired.

Figure 9:
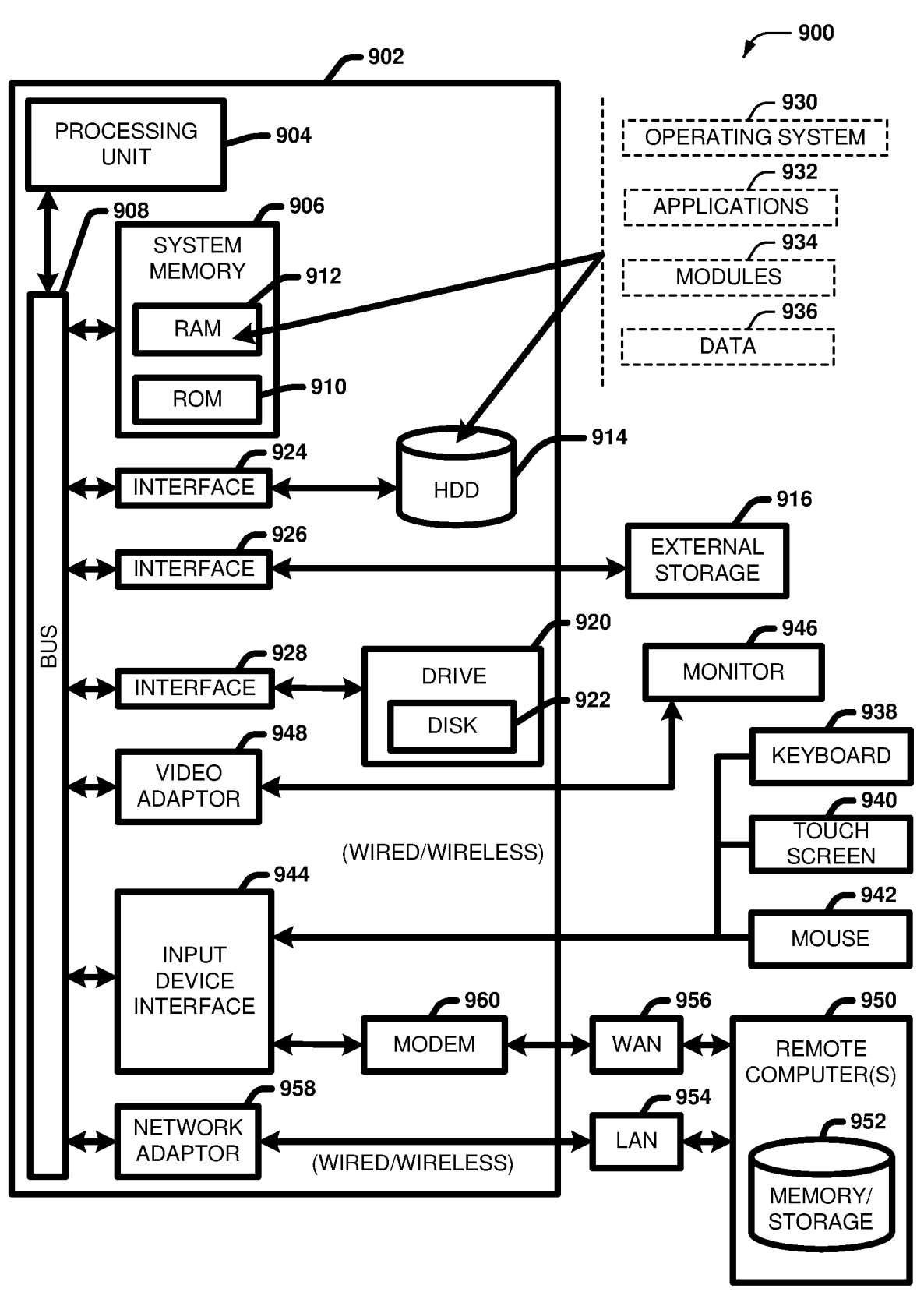
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and nonremovable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 10 is a schematic block diagram of a sample computing environment 1000 with which the disclosed subject matter can interact. The sample computing environment 1000 includes one or more client(s) 1010. The client(s) 1010 can be hardware and/or software (e.g., threads, processes, computing devices). The sample computing environment 1000 also includes one or more server(s) 1030. The server(s) 1030 can also be hardware and/or software (e.g., threads, processes, computing devices). The servers 1030 can house threads to perform transformations by employing one or more embodiments as described herein, for example. One possible communication between a client 1010 and a server 1030 can be in the form of a data packet adapted to be transmitted between two or more computer processes. The sample computing environment 1000 includes a communication framework 1050 that can be employed to facilitate communications between the client(s) 1010 and the server(s) 1030. The client(s) 1010 are operably connected to one or more client data store(s) 1020 that can be employed to store information local to the client(s) 1010. Similarly, the server(s) 1030 are operably connected to one or more server data store(s) 1040 that can be employed to store information local to the servers 1030.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments of the subject claimed innovation are provided in the subject matter that follows:

1. A system, comprising: a processor that executes computer-executable components stored in a computer-readable memory, the computer-executable components comprising: a receiver component that accesses a neural network, wherein the neural network includes a first set of layers trained to perform a first computing task; an extension component that inserts a second set of layers into the neural network, wherein the second set of layers receive as input latent activations from the first set of layers; and a training component that trains, without changing the first set of layers, the second set of layers to perform a second computing task that is different from the first computing task.

2. The system of any preceding clause, wherein the computer-executable components further comprise: an execution component that executes the neural network on an inputted data candidate, wherein the first set of layers generate a first output corresponding to the first computing task, and wherein the second set of layers generate a second output corresponding to the second computing task.

3. The system of any preceding clause, wherein, during training of the second set of layers, the training component iteratively updates parameters of the second set of layers via backpropagation.

4. The system of any preceding clause, wherein, during training of the second set of layers, the training component freezes parameters of the first set of layers.

5. The system of any preceding clause, wherein the first set of layers is a U-Net including an encoder portion and a decoder portion, and wherein the latent activations are generated by the encoder portion.

6. The system of any preceding clause, wherein the second set of layers execute in parallel with the decoder portion.

7. The system of any preceding clause, wherein the first computing task is image segmentation, and wherein the second computing task is image detection or image orientation detection.

8. A computer-implemented method, comprising: accessing, by a device operatively coupled to a processor, a neural network, wherein the neural network includes a first set of layers trained to perform a first computing task; inserting, by the device, a second set of layers into the neural network, wherein the second set of layers receive as input latent activations from the first set of layers; and training, by the device and without changing the first set of layers, the second set of layers to perform a second computing task that is different from the first computing task.

9. The computer-implemented method of any preceding clause, further comprising: executing, by the device, the neural network on an inputted data candidate, wherein the first set of layers generate a first output corresponding to the first computing task, and wherein the second set of layers generate a second output corresponding to the second computing task.

10. The computer-implemented method of any preceding clause, further comprising: during the training of the second set of layers, iteratively updating, by the device, parameters of the second set of layers via backpropagation.

11. The computer-implemented method of any preceding clause, further comprising: during the training of the second set of layers, freezing, by the device, parameters of the first set of layers.

12. The computer-implemented method of any preceding clause, wherein the first set of layers is a U-Net including an encoder portion and a decoder portion, and wherein the latent activations are generated by the encoder portion.

13. The computer-implemented method of any preceding clause, wherein the second set of layers execute in parallel with the decoder portion.

14. The computer-implemented method of any preceding clause, wherein the first computing task is image segmentation, and wherein the second computing task is image detection or image orientation detection.

15. A computer program product for facilitating extension of existing neural networks without affecting existing outputs, the computer program product comprising a computer readable memory having program instructions embodied therewith, the program instructions executable by a processing component to cause the processing component to: access, by the processor, a neural network, wherein the neural network includes a first set of layers trained to perform a first computing task; insert, by the processor, a second set of layers into the neural network, wherein the second set of layers receive as input latent activations from the first set of layers; and train, by the processor and without changing the first set of layers, the second set of layers to perform a second computing task that is different from the first computing task.

16. The computer program product of any preceding clause, wherein the program instructions are further executable to cause the processor to: execute, by the processor, the neural network on an inputted data candidate, wherein the first set of layers generate a first output corresponding to the first computing task, and wherein the second set of layers generate a second output corresponding to the second computing task.

17. The computer program product of any preceding clause, wherein the program instructions are further executable to cause the processor to: during training of the second set of layers, iteratively update, by the processor, parameters of the second set of layers via backpropagation.

18. The computer program product of any preceding clause, wherein the program instructions are further executable to cause the processor to: during training of the second set of layers, freeze, by the processor, parameters of the first set of layers.

19. The computer program product of any preceding clause, wherein the first set of layers is a U-Net including an encoder portion and a decoder portion, and wherein the latent activations are generated by the encoder portion.

20. The computer program product of any preceding clause, wherein the second set of layers execute in parallel with the decoder portion.

What is claimed is:

1. A system, comprising:
a processor that executes computer-executable components stored in a computer-readable memory, the computer-executable components comprising:
a receiver component that accesses a neural network, wherein the neural network includes a first set of layers trained to perform a first computing task, and wherein respective layers of the first set of layers are connected in series, and wherein the first set of layers comprises:
an input layer,
at least two intermediate layers, wherein the intermediate layers of the at least two intermediate layers are connected in series, where a first intermediate layer of the at least two intermediate layers is connected to the input layer, and
an output layer that is connected to a last intermediate layer of the at least two intermediate layers;
an extension component that:
divides the first set of layers, between two intermediate layers of the at least two intermediate layers, into a first portion of layers and a second portion of layers, and
inserts a second set of layers into the neural network directly after the first portion of layers, wherein the second set of layers is arranged parallel to the second portion of layers and the second set of layers is arranged in series with the first portion of layers, wherein the second set of layers receive as input latent activations from the first portion of layers, wherein the second portion of layers also receives as input the latent activations from the first portion of layers, and wherein the first set of layers does not receive any outputs from the second set of layers; and a training component that trains, without changing any part of the first set of layers based on any outputs from the second set of layers, the second set of layers to perform a second computing task that is different from the first computing task, wherein the training changes parameters of the second set of layers.

2. The system of claim 1, wherein the computer-executable components further comprise:

an execution component that executes the neural network on an inputted data candidate, wherein the first set of layers generate a first output corresponding to the first computing task, and wherein the second set of layers generate a second output corresponding to the second computing task.

3. The system of claim 1, wherein, during training of the second set of layers, the training component iteratively updates the parameters of the second set of layers via backpropagation.

4. The system of claim 3, wherein, during training of the second set of layers, the training component freezes parameters of the first set of layers.

5. The system of claim 1, wherein the first set of layers is a U-Net including an encoder portion and a decoder portion, and wherein the latent activations are generated by the encoder portion.

6. The system of claim 5, wherein the second set of layers execute in parallel with the decoder portion.

7. The system of claim 5, wherein the first computing task is image segmentation, and wherein the second computing task is image detection or image orientation detection.

8. A computer-implemented method, comprising:

accessing, by a device operatively coupled to a processor, a neural network, wherein the neural network includes a first set of layers trained to perform a first computing task, and wherein respective layers of the first set of layers are connected in series, and wherein the first set of layers comprises:

an input layer, at least two intermediate layers, wherein the intermediate layers of the at least two intermediate layers are connected in series, where a first intermediate layer of the at least two intermediate layers is connected to the input layer, and an output layer that is connected to a last intermediate layer of the at least two intermediate layers;

dividing, by the device, the first set of layers, between two intermediate layers of the at least two intermediate layers, into a first portion of layers and a second portion of layers;

inserting, by the device, a second set of layers into the neural network directly after the first portion of layers, wherein the second set of layers is arranged parallel to the second portion of layers and the second set of layers is arranged in series with the first portion of layers, wherein the second set of layers receive as input latent activations from the first portion of layers, wherein the second portion of layers also receives as input the latent activations from the first portion of layers, and wherein the first set of layers does not receive any outputs from the second set of layers; and training, by the device and without changing any part of the first set of layers based on any outputs from the second set of layers, the second set of layers to perform a second computing task that is different from the first computing task, wherein the training changes parameters of the second set of layers.

9. The computer-implemented method of claim 8, further comprising:

executing, by the device, the neural network on an inputted data candidate, wherein the first set of layers generate a first output corresponding to the first computing task, and wherein the second set of layers generate a second output corresponding to the second computing task.

10. The computer-implemented method of claim 8, further comprising:

during the training of the second set of layers, iteratively updating, by the device, the parameters of the second set of layers via backpropagation.

11. The computer-implemented method of claim 10, further comprising:

during the training of the second set of layers, freezing, by the device, parameters of the first set of layers.

12. The computer-implemented method of claim 8, wherein the first set of layers is a U-Net including an encoder portion and a decoder portion, and wherein the latent activations are generated by the encoder portion.

13. The computer-implemented method of claim 12, wherein the second set of layers execute in parallel with the decoder portion.

14. The computer-implemented method of claim 12, wherein the first computing task is image segmentation, and wherein the second computing task is image detection or image orientation detection.

15. A computer program product for facilitating extension of existing neural networks without affecting existing outputs, the computer program product comprising a computer-readable memory having program instructions embodied therewith, the program instructions executable by a processor to cause the processor to:

access, by the processor, a neural network, wherein the neural network includes a first set of layers trained to perform a first computing task, and wherein respective layers of the first set of layers are connected in series, and wherein the first set of layers comprises:

an input layer, at least two intermediate layers, wherein the intermediate layers of the at least two intermediate layers are connected in series, where a first intermediate layer of the at least two intermediate layers is connected to the input layer, and an output layer that is connected to a last intermediate layer of the at least two intermediate layers;

divide, by the processor, the first set of layers, between two intermediate layers of the at least two intermediate layers, into a first portion of layers and a second portion of layers;

insert, by the processor, a second set of layers into the neural network directly after the first portion of layers, wherein the second set of layers is arranged parallel to the second portion of layers and the second set of layers is arranged in series with the first portion of layers, wherein the second set of layers receive as input latent activations from the first portion of layers, wherein the second portion of layers also receives as input the latent activations from the first portion of layers, and wherein the first set of layers does not receive any outputs from the second set of layers; and train, by the processor and without changing any part of the first set of layers based on any outputs from the second set of layers, the second set of layers to perform a second computing task that is different from the first computing task, wherein the training changes parameters of the second set of layers.

16. The computer program product of claim 15, wherein the program instructions are further executable to cause the processor to:

execute, by the processor, the neural network on an inputted data candidate, wherein the first set of layers generate a first output corresponding to the first computing task, and wherein the second set of layers generate a second output corresponding to the second computing task.

17. The computer program product of claim 15, wherein the program instructions are further executable to cause the processor to:

during training of the second set of layers, iteratively update, by the processor, the parameters of the second set of layers via backpropagation.

18. The computer program product of claim 17, wherein the program instructions are further executable to cause the processor to:

during training of the second set of layers, freeze, by the processor, parameters of the first set of layers.

19. The computer program product of claim 15, wherein the first set of layers is a U-Net including an encoder portion and a decoder portion, and wherein the latent activations are generated by the encoder portion.

20. The computer program product of claim 19, wherein the second set of layers execute in parallel with the decoder portion.

\* \* \* \* \*